Figure 1:
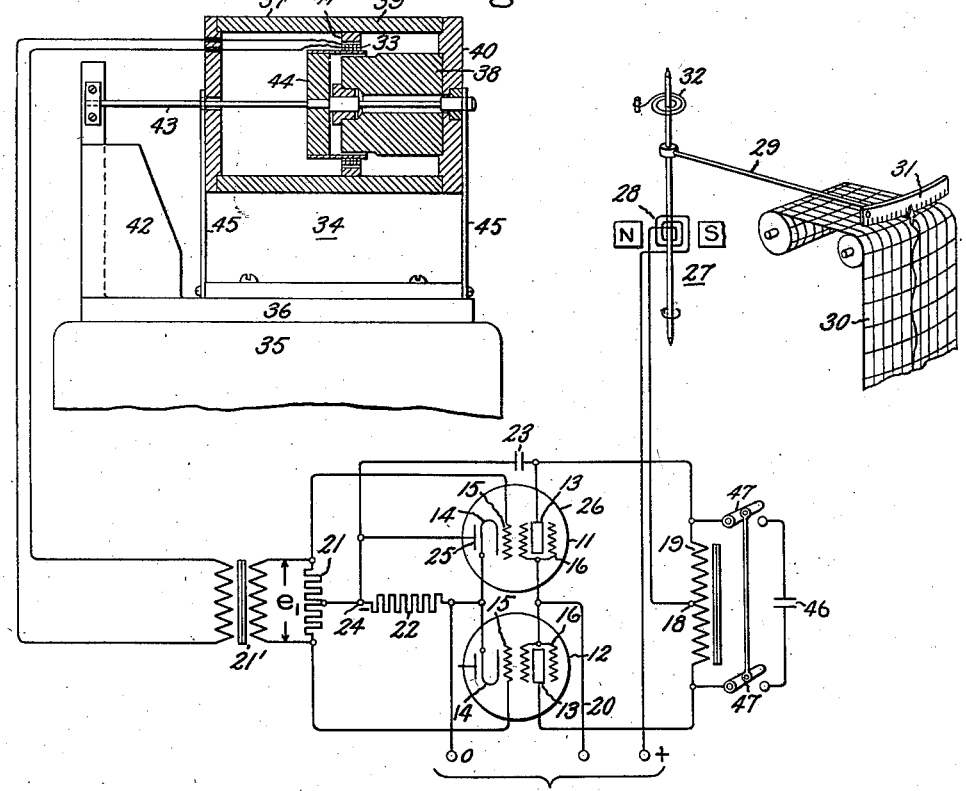

June 1, 1937.  M. S. MEAD, JR  2,082,646

TAPERED SCALE VOLTMETER

Filed Dec. 13, 1934

Inventor:
Milton S. Mead Jr,
by Harry E. Dunham
His Attorney.

Patented June 1, 1937

2,082,646

UNITED STATES PATENT OFFICE 2,082,646

TAPERED SCALE VOLTMETER

Milton S. Mead, Jr., Schenectady, N. Y., assignor to General Electric Company, a corporation of New York Application December 13, 1934, Serial No. 757,311

13 Claims. (Cl. 175—183)

My invention relates to high sensitivity voltmeters, and concerns particularly voltmeters of the discharge tube type.

One of the objects of my invention is to provide a sensitive voltmeter having a progressively varying scale distribution, particularly one having a scale expanded at the lower end, such as a logarithmic scale.

Another object of my invention is to produce a voltmeter which may be provided, when desired, with an inverse frequency characteristic.

Still another object of my invention is to produce vibration-measuring apparatus which may be adjusted to respond either to vibration velocity or to amplitude of vibration.

Other and further objects and advantages will become apparent as the description proceeds.

In order to measure small alternating-current voltages, various types of vacuum tube amplifying circuits have been devised. When recording apparatus or switchboard-indicating meters are to be operated in response to minute alternating-current voltages, it is desirable to provide an amplifier which will produce a strong direct current varying in response to variations in the alternating voltage or current to be measured. In certain applications, it becomes desirable also that the device should have a tapered response. For instance, in apparatus for measuring vibration which may vary in strength over very wide ranges, the apparatus should be highly sensitive to weak vibrations and relatively less sensitive to strong vibrations in order that the entire range of vibrations may be measured and very strong vibrations will not injure the apparatus. Such apparatus will have a scale expanded at the lower ends. It is also desirable in certain types of apparatus to provide a voltmeter which may be adjusted to have an inverse frequency characteristic. For example, in vibration-measuring apparatus, voltages are obtained which are proportional to vibration velocity or the product of the amplitude of vibration and frequency. In order to obtain readings of amplitude directly, one may employ a voltmeter having an inverse frequency characteristic. My invention has for its object the provision of a voltmeter satisfying these requirements.

In carrying out my invention in its preferred form I provide a pair of discharge tubes of the grid controlled type arranged in the well known push-pull connection. Means are provided for reducing the amplification of the discharge tubes as the input voltage to be measured increases in strength. In this manner, an open scale is obtained in the lower portion of the scale range of the voltmeter.

The features of my invention which I believe to be novel and patentable will be pointed out in the claims appended hereto. A better understanding of my invention may be obtained from the following description taken in connection with the accompanying drawing in which Fig. 1 represents schematically a vibration-measuring apparatus employing a tapered-response discharge-tube voltmeter in accordance with my invention and Fig. 2 is the circuit diagram of a modified form of voltmeter.

Figure 2:
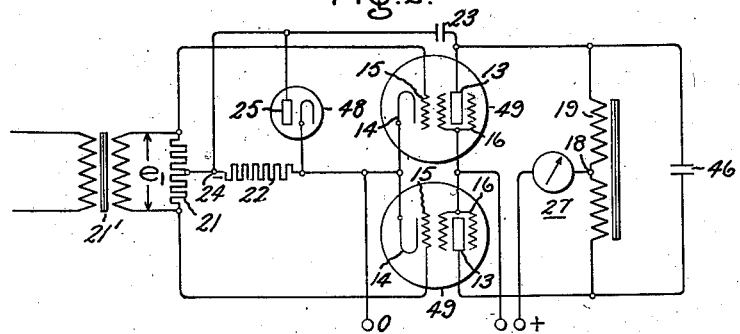

Referring now more in detail to the drawing in which like reference characters are used to designate like parts throughout, in Fig. 1, I have illustrated my vibration-measuring system utilizing the tapered response thermionic voltmeter. It will be understood, however, that the voltmeter is not limited to this application but is useful independently in numerous other applications where voltage must be measured. My system for measuring vibrational energy is claimed in my copending application, Serial No. 57,232, filed September 26, 1935.

The voltmeter comprises a pair of vacuum tubes 11 and 12 so that the push-pull connection may be employed. I prefer to use the push-pull connection for the sake of greater output and also to avoid undesirable effects, such as regeneration and oscillation, arising from feeding back A. C. voltage from plate to grid, but it will be understood that my invention may also be carried out with only a single tube in the ordinary connection.

The discharge tubes 11 and 12 comprise anodes 13, cathodes 14, and control grids 15. The cathodes 14 may be either of the filamentary or indirectly heated type. To avoid confusion in the drawing, the current source for heating the cathodes 14 has not been shown since the construction and operation of such tubes are well known in the art.

In order to increase the power and improve the operating characteristics of the apparatus, screen grids 16 may be employed. Anode circuits are formed between the anodes 13 and the cathodes 14 and are energized by a source of direct current 17. The negative side of the current source 17, represented as being at zero potential, is connected to the cathodes 14. The positive side of the current source 17 is connected to a midtap 18 of a reactor 19, the outer terminals of which are connected to the anodes 13. If the screen grids 16 are employed, they are connected by a common lead to an intermediate potential tap 20 of the current source 17. Voltage $e_1$, to be measured, is supplied in the grid circuits as an input voltage. For the push-pull connection, the input voltage is divided by means of a resistor 21 having its outer terminals connected to the grids 15 of tubes 11 and 12, respectively, and having its midtap connected to the common terminal of the cathodes 14 through a grid-circuit resistor 22. In this way, half the input voltage $e_1$ is supplied in the grid circuit of each tube as is well known in connection with push-pull circuits. In the case of a simple single-tube circuit, of course, the entire voltage would be connected in the one grid circuit.

A grid-biasing condenser 23 is connected between anode 13 of tube 11 and the terminal 24 on the input side of the grid-circuit resistor 22. A rectifier is connected across the grid-circuit resistor 22 with its positive side connected to the input terminal 24. If desired, the rectifier may comprise an anode 25 placed within the same envelope 26 as the other elements of the tube 11 so as to form, in cooperation with the cathode 14, a diode rectifier.

Included in the anode circuit is a current-responsive device 27 which may be of any desired type responsive to direct current. It may consist, for example, as shown, of a recording instrument having a movable current-conducting coil 28 carrying a pen arm 29, cooperating with a moving chart 30 to produce a record curve. If desired, a scale 31 may also be provided to permit more easily reading the instantaneous indications as the record is being produced. The movable element 28 of the recording instrument 27 is provided with a biasing spring 32 arranged to bias the instrument to the full scale position shown as being at the right-hand end of scale 31, and the connections to the current-conducting winding 28 are such that, with maximum direct-current flowing therein, the pen arm 29 is deflected down scale to the zero scale position.

In the application of the voltmeter illustrated in the drawing, the input voltage $e_1$ is derived from the vibrating coil 33 of a vibration-measuring device 34, which may be of any desired type. Preferably, a step-up transformer 21' is interposed between the coil 33 and the thermionic voltmeter. In the particular application illustrated, I have shown a vibration-measuring unit which is particularly adapted for measuring vibration of objects upon which the vibration-measuring unit 34 may be rested or to which it may be fastened, such for example, as a turbine bearing 35. The vibration unit 34 consists of a base 36 in contact with the object, the vibration of which is to be measured, and an element 37 of relatively great mass including a permanent magnet 38 with a cylindrical casing 39, a circular end plate 40, and an annular piece 41 providing a magnetic return for the permanent magnet 38. There is also provided a rigid bracket 42 which serves to form a rigid connection through a rod 43 and a coil-supporting member 44 between the base 36 and the vibrating current-conducting coil 33. The connection is rigid so far as horizontal axial motion of the coil 33 is concerned. The element of relatively great mass 37 is supported upon the base 36 by means of springs 45 which permit the element 37 to remain relatively stationary as the base 36 and the bearing 35 are vibrated.

Accordingly, relative motion takes place between the conducting coil 33 and the field of the permanent magnet 38, and the voltages induced in the coil are proportional to its vibration velocity. As the motion of the coil 33 is oscillatory, an alternating voltage will be induced therein. The instantaneous value of the voltage is proportional to the instantaneous velocity of the coil 33. Accordingly, the maximum, effective, and average values of induced voltage will be proportional to the maximum, effective, and average values of vibration velocity. By means of my vacuum tube amplifying circuit, an indication of vibration velocity may be obtained in the direct-current instrument 27 even though the vibration velocity is so low as to produce only weak alternating voltages.

It is apparent that, for a given amplitude of vibration, the vibration velocity will increase with the frequency of vibration so that the vibration velocity and the induced voltage are proportional to the product of amplitude of vibration and frequency. In some cases, an indication of amplitude of vibration rather than vibration velocity is desired, and, in such cases, I arrange the vacuum tube voltmeter in such a manner that an inverse frequency response is obtained. For this purpose, I provide a condenser 46 and switches 47 for connecting the condenser 46 in parallel with the reactor 19. When inverse frequency response is desired, the inductive reactance of the reactor 19 is made high with respect to the capacitive reactance of the condenser 46.

The operation of the vacuum tube voltmeter is as follows:

When the voltage $e_1$ across the resistor 21 is zero, there is no grid bias, the anode currents in the vacuum tubes 11 and 12 are a maximum and a maximum direct-current flows in the movable winding 28, deflecting the arm 29 to the zero indicating position. Since the anode currents flow in the opposite direction through the reactor 19, the magnetizing effect of the direct currents will cancel and no saturation effects are produced in the reactor 19. When an alternating voltage appears across the resistor 21, this voltage will be amplified by the tubes 11 and 12 and an increased alternating-current voltage will be produced between the anode 13 and the cathode 14 of the tube 11, owing to the presence of the reactor 19 in the anode circuit. The alternating voltage charges the condenser 23 to its peak value through the diode rectifier 25, the arrangement being such that the left-hand plate of the condenser 23 is negative. The resistance of the resistor 22 is made so high that the negative charge cannot readily leak off. Accordingly, a negative-biasing potential will be impressed on the grids 15 of tubes 11 and 12.

In consequence, as the voltage $e_1$ increases, the potentials of the grids 15 are depressed and the amplification of the tubes is decreased. The direct current through the current-conducting winding 28 of the instrument 27 will also decrease as the voltage $e_1$ increases and, due to the decrease in the amplification factor, successive increments of voltage at $e_1$ will produce smaller effects on the anode circuit so that a tapered response is obtained. In this manner, the apparatus responds with great sensitivity to very minute vibrations and, as the strength of vibration increases, the effect is decreased so that a very wide range of vibration may be recorded on the chart 30. If the constants are properly chosen, a logarithmic response may be obtained from the instrument 27.

If it is desired to measure amplitude of vibration rather than vibration velocity, the switches 47 are closed. Since the impedance of the reactor 19 was made very high with respect to that of the condenser 46, the combined reactance will vary substantially as that of a condenser and will vary inversely with frequency. As the amplification of a screen grid discharge tube is proportional to the impedance in the anode circuit, variation in grid bias and the response obtained are proportional to the quotient of vibration velocity and frequency or proportional to the amplitude of vibration.

For the sake of compactness, I prefer to use pentode tubes combining the anodes, cathodes, and control grids of the usual discharge tube and the electrodes of the usual diode rectifier in a single envelope 26. However, it will be understood that, if desired, a separate rectifier, such as the diode rectifier 48, and either triode or screen grid tubes 49 in separate envelopes may be employed as illustrated in Fig. 2.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A tapered response voltmeter having its scale expanded at the lower end, which voltmeter comprises in combination, a discharge tube having an anode, a cathode, and a control grid, a source of current energizing an anode circuit formed through the anode and cathode of said tube and having positive and negative terminals, a reactor connected between the positive terminal of said source and the anode of said tube, a current-responsive instrument connected in series with said reactor and said source in the anode circuit, a grid circuit resistor having a terminal connected to the cathode of said tube and an input terminal, the voltage to be measured being applied between said input terminal and the control grid of said tube, a condenser connected between the anode of said tube and the input terminal of said resistor, and a rectifier connected across said resistor with its positive side connected to the input terminal.

2. A tapered response voltmeter having its scale expanded at the lower end, which voltmeter comprises in combination, a pair of discharge tubes each having an anode, a cathode, and a control grid, a source of current energizing parallel anode circuits formed through the anodes and cathodes of said tubes, said cathodes being electrically connected, a current-responsive device connected in series with said current source and said cathodes, means for introducing a negative grid bias, increasing in value with an increase in alternating current through said tubes in order to decrease the amplification factor thereof, and means for applying the voltage to be measured symmetrically in grid circuits between the cathodes and control grids of said tubes.

3. A tapered response voltmeter having its scale expanded at the lower end, which voltmeter comprises in combination, a pair of discharge tubes each having an anode, a cathode, and a control grid, a source of current energizing anode circuits formed through the anodes and cathodes of said tubes and having positive and negative terminals, reactors connected in parallel with respect to the anode circuits of said tubes between the positive terminal of said source and the anodes of said tubes, the cathodes of said tubes being electrically connected, a current-responsive device connected in series with said current source and said cathodes, a grid circuit resistor having a terminal connected to the cathode of said tubes and an input terminal, an impedance across which the voltage to be measured is applied having a midpoint connected to said input terminal and having end terminals connected to the control grids of said tubes, a condenser connected between the anode of one of said tubes and the input terminal of said resistor, and a rectifier connected across said resistor with its positive side connected to the input terminal.

4. A tapered response inverse frequency voltmeter having its scale expanded at the lower end, which voltmeter comprises in combination, a discharge tube having an anode, a cathode, and a control grid, a source of current energizing an anode circuit formed through the anode and cathode of said tube and having positive and negative terminals, an inductive reactor connected between the positive terminal of said source and the anode of said tube, a condenser connected in parallel with said reactor and having a relatively low impedance with respect to said reactor, a current-responsive device connected in series with said reactor and said source in the anode circuit, the voltage to be measured being applied in a grid circuit between the control grid and the anode of said tube, and means controlled by the alternating-current output voltage of said tube for depressing the grid potential and decreasing the amplification factor of the tube as the alternating-current output voltage increases.

5. A tapered response voltmeter having its scale expanded at the lower end, which voltmeter comprises in combination, a discharge tube having a single envelope enclosing an evacuated space containing an anode, a cathode, a control grid, and a diode rectifier anode, a source of current energizing the anode circuit formed through the anode and cathode of said tube and having positive and negative terminals, a reactor connected between the positive terminal of said source and the anode, a current-responsive device connected in series with said source, a grid circuit resistor having a terminal connected to the cathode of said tube and an input terminal, the voltage to be measured being supplied between said input terminal and the control grid of said tube, and a condenser connected between the anode of said tube and the input terminal of said resistor, the diode rectifier anode of said tube being connected to the input terminal of said resistor.

6. A tapered response voltmeter having its scale expanded at the lower end, which voltmeter comprises in combination, a pair of discharge tubes each having an envelope enclosing an evacuated space containing an anode, a cathode, a control grid, a screen grid, and a diode rectifier anode, a source of voltage energizing anode circuits formed through the anodes and cathodes of said tubes having positive and negative terminals and having an intermediate potential terminal connected to said screen grids, a reactor having a midtap connected to the positive terminal of said source and having end terminals each connected to the anode of one of said tubes, a current-responsive device connected in series with said source and a portion of the anode circuit common to both tubes, a grid circuit resistor having a terminal connected to the cathodes of said tubes and an input terminal, an impedance to which is applied the voltage to be measured having a midtap connected to said input terminal, an end terminal connected to the control grid of one of said tubes and a second end terminal connected to the control grid of the other of said tubes, and a condenser connected between the anode of one of said tubes and the input terminal of said resistor, the diode rectifier anode in the last mentioned tube being connected to the input terminal of said resistor.

7. A tapered response inverse frequency voltmeter having its scale expanded at the lower end, which voltmeter comprises in combination, a pair of discharge tubes each having an envelope enclosing an evacuated space containing an anode, a cathode, a control grid, a screen grid, and a diode rectifier anode, a source of voltage energizing anode circuits formed through the anodes and cathodes of said tubes, having positive and negative terminals and having an intermediate potential terminal connected to said screen grids, an impedance having a midtap connected to the positive terminal of said source and having end terminals, one connected to the anode of one of said tubes and the other end terminal connected to the anode of the other of said tubes, a condenser connected between the anodes of said tubes, a current-responsive device connected in series with said source, and a portion of the anode circuit common to both tubes, a grid circuit resistor having a terminal connected to the cathodes of said tubes and an input terminal, an impedance to which is applied the voltage to be measured having a midtap connected to said input terminal and end terminals, one of which is connected to the control grid of one of said tubes and the other of which is connected to the control grid of the other of said tubes, and a condenser connected between the anode of one of said tubes and the input terminal of said resistor, the diode rectifier anode in the last mentioned tube being connected to the input terminal of said resistor.

8. A tapered response voltmeter having its scale expanded at the lower end, which voltmeter comprises in combination, a discharge tube having an anode, a cathode, and a control grid, a source of current energizing an anode circuit formed through the anode and cathode of said tube, a deflecting direct-current responsive instrument connected in said anode circuit having a control spring biasing the instrument to its maximum indicating position and permitting said instrument to assume its zero indicating position with maximum current flowing therein, said maximum current corresponding to the direct current normally flowing in the anode circuit of said discharge tube, the voltage to be measured being supplied in a grid circuit formed between the control grid and the cathode, means for depressing the potential of said control grid in accordance with increase in alternating-current output voltage of the tube thereby decreasing the amplification factor of the tube and decreasing the anode direct current in successively smaller increments so as to taper the response of said instrument to increasing measured alternating voltages.

9. A thermionic voltmeter for alternating-current circuits comprising in combination, a discharge tube having an anode, a cathode, and a control grid, a source of current energizing an anode circuit formed through the anode and cathode of said tube, a direct-current responsive device connected in series with said current source and said anode and cathode in the anode circuit, means for applying an alternating voltage to be measured between the cathode and control grid of said tube and a capacitative coupling including a rectifier between the anode and the control grid of said tube so as to impress a negative bias on the grid in response to the voltage to be measured.

10. A thermionic voltmeter for alternating-current circuits comprising in combination, a discharge tube with an anode, a cathode, and a control grid, a source of current energizing an anode circuit formed through the anode and cathode of said tube, a direct-current responsive device connected in series with said current source and said anode and cathode in the anode circuit, the alternating voltage to be measured being applied in a grid circuit formed between the cathode and the control grid of said tube, means including a rectifier for coupling said grid circuit to said anode circuit, the connection being such that a negative grid bias is produced in said grid circuit by alternating current appearing in the anode circuit.

11. A thermionic voltmeter for alternating-current circuits comprising in combination, a discharge tube having an anode, a cathode, and a control grid, a source of current energizing an anode circuit formed through the anode and cathode of said tube, an inverted scale direct-current measuring device connected in series with said current source and said anode and cathode in the anode circuit, and means controlled in response to alternating current in the anode circuit for introducing a negative bias in a grid circuit formed between the control grid and cathode of said tube, the alternating voltage to be measured being applied in said grid circuit.

12. A thermionic voltmeter for alternating-current circuits comprising in combination, a discharge tube having an anode, a cathode, and a control grid, a source of current energizing an anode circuit formed through the anode and cathode of said tube, an inverted scale direct-current measuring device connected in series with said current source and said anode and cathode in the anode circuit, a grid circuit being formed between the control grid and the cathode of said tube and the voltage to be measured being applied therein, and a rectifier energized by the anode circuit for impressing a negative bias on the control grid of said tube.

13. A thermionic voltmeter for alternating-current circuits comprising in combination, a discharge tube having an anode, a cathode, a screen grid, and a control grid, a source of voltage energizing an anode circuit formed through the anode and cathode of said tube having positive and negative terminals and having an intermediate potential terminal connected to said screen grid, a direct-current responsive device connected in series with said current source and said anode and cathode in the anode circuit, a grid circuit being formed between the control grid and the cathode of said tube and the voltage to be measured being applied therein, and means for impressing a negative bias on the control grid of said tube increasing in value with an increase in alternating current through said tube.

MILTON S. MEAD, Jr.